US012777414B2

(12) United States Patent
Sawada

(10) Patent No.: US 12,777,414 B2
(45) Date of Patent: Oct. 27, 2026

(54) WIRELESS COMMUNICATION APPARATUS, METHOD FOR CONTROLLING WIRELESS COMMUNICATION APPARATUS, AND STORAGE MEDIUM

(71) Applicant: CANON KABUSHIKI KAISHA, Tokyo (JP)

(72) Inventor: Tetsuya Sawada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 355 days.

(21) Appl. No.: 18/470,174

(22) Filed: Sep. 19, 2023

(65) Prior Publication Data

US 2024/0107440 A1 Mar. 28, 2024

(30) Foreign Application Priority Data

Sep. 22, 2022 (JP) ................................ 2022-151519

(51) Int. Cl.

*H04W 4/00* (2018.01)
*H04W 48/16* (2009.01)
*H04W 48/20* (2009.01)
*H04W 84/12* (2009.01)

(52) U.S. Cl.

CPC ........... *H04W 48/20* (2013.01); *H04W 48/16* (2013.01); *H04W 84/12* (2013.01)

(58) Field of Classification Search

CPC ..... H04W 48/20; H04W 48/16; H04W 84/12; H04W 88/06; H04W 92/20; H04W 76/15; H04W 8/08

USPC .......................................................... 370/338

See application file for complete search history.

(56) References Cited

U.S. PATENT DOCUMENTS

| | | | | |
|---|---|---|---|---|
| 6,269,395 B1 * | 7/2001 | Blatherwick | ........... | G06F 9/451 709/227 |
| 2005/0005042 A1 * | 1/2005 | Fukunaga | ............. | G06F 9/4413 710/62 |
| 2020/0351988 A1 | 11/2020 | Chen | | |
| 2021/0029766 A1 * | 1/2021 | Zhang | .................... | H04W 76/15 |
| 2021/0050999 A1 * | 2/2021 | Huang | .................... | H04L 9/088 |

(Continued)

FOREIGN PATENT DOCUMENTS

| | | |
|---|---|---|
| JP | 2018019366 A | 2/2018 |
| WO | 2021238578 A1 | 12/2021 |

*Primary Examiner* — Temica M Beamer
(74) *Attorney, Agent, or Firm* — Canon.U.S.A., Inc. IP Division

(57) ABSTRACT

A wireless communication apparatus including a plurality of stations (STAs) including at least first and second STAs, and connectable to a plurality of access points (APs) in parallel, the wireless communication apparatus includes a detection unit configured to detect an AP, a display control unit configured to cause a display unit to display a plurality of APs detected, and a selection unit configured to select at least one AP among the plurality of APs displayed on the display unit, and an establishment unit configured to establish a link with the AP selected by the selection unit. Based on a user having performed a predetermined operation in a state where a first AP and a second AP are selected by the selection unit, the establishment unit establishes a link with the first AP by using the first STA and establishes a link with the second AP by using the second STA.

10 Claims, 11 Drawing Sheets

(56) References Cited

U.S. PATENT DOCUMENTS

| | | | | |
|---|---|---|---|---|
| 2022/0346166 | A1* | 10/2022 | Guo | H04L 45/245 |
| 2022/0417857 | A1* | 12/2022 | Guo | H04W 52/0229 |
| 2023/0046270 | A1* | 2/2023 | Huang | H04L 1/22 |
| 2025/0073521 | A1* | 3/2025 | Byun | A63B 21/4029 |
| 2025/0240685 | A1* | 7/2025 | Kneckt | H04L 5/0098 |

* cited by examiner

WIRELESS COMMUNICATION APPARATUS, METHOD FOR CONTROLLING WIRELESS COMMUNICATION APPARATUS, AND STORAGE MEDIUM

BACKGROUND OF THE INVENTION

Field of the Invention

The present invention relates to a wireless communication apparatus, a method for controlling the wireless communication apparatus, and a storage medium.

Description of the Related Art

As a communication standard relating to wireless local area network (LAN), an Institute of Electrical and Electronics Engineers (IEEE) 802.11 standard is known. A Wi-Fi standard defined by a Wi-Fi Alliance is also known.

There is proposed a wireless communication apparatus that supports the IEEE802.11 standard and the Wi-Fi standard and is capable of operating a station (STA) and an access point (AP) in parallel. The wireless communication apparatus is able to establish a link with an external AP by the STA and participate in a network formed by the external AP. The wireless communication apparatus is able to establish a link with an external STA by the AP and allow the external STA to participate in a network formed by the own apparatus.

For example, Japanese Patent Application Laid-Open No. 2018-19366 discusses a communication apparatus that is capable of performing an STA mode and an AP mode in parallel.

On the other hand, it is considered that one wireless communication apparatus is configured to include a plurality of STAs, which makes it possible to establish links with a plurality of external APs in parallel.

In the wireless communication apparatus configured in such a manner, operations for setting for establishing a link with a certain AP with one of the STAs is complicated for a user. For example, the wireless communication apparatus including a first STA and a second STA establishes links with a first AP and a second AP. In this case, the user initially performs operation to cause the first STA to establish the link with the first AP, and the first STA accordingly establishes the link with the first AP. Next, the user performs operation to cause the second STA to establish the link with the second AP, so that the second STA establishes the link with the second AP. In the case where the links with the plurality of APs are established in parallel by using the plurality of STAs as described above, it is necessary for the user to perform an operation of setting which AP the link is to be established with the second STA after the first STA establishes the link.

The present invention is directed to a technique for improving operability in establishing links with external APs in a wireless communication apparatus including a plurality of STAs.

SUMMARY OF THE INVENTION

According to an aspect of the present invention, a wireless communication apparatus including a plurality of stations (STAs) including at least a first STA and a second STA, and connectable to a plurality of access points (APs) in parallel, includes a detection unit configured to detect an AP, a display control unit configured to cause a display unit to display a plurality of APs detected by the detection unit, a selection unit configured to select at least one AP among the plurality of APs displayed on the display unit, and an establishment unit configured to establish a link with the AP selected by the selection unit, wherein, based on a user having performed a predetermined operation in a state where a first AP and a second AP are selected by the selection unit, the establishment unit establishes a link with the first AP by using the first STA and establishes a link with the second AP by using the second STA.

Further features of the present invention will become apparent from the following description of exemplary embodiments with reference to the attached drawings.

DESCRIPTION OF THE EMBODIMENTS

Figure 1:
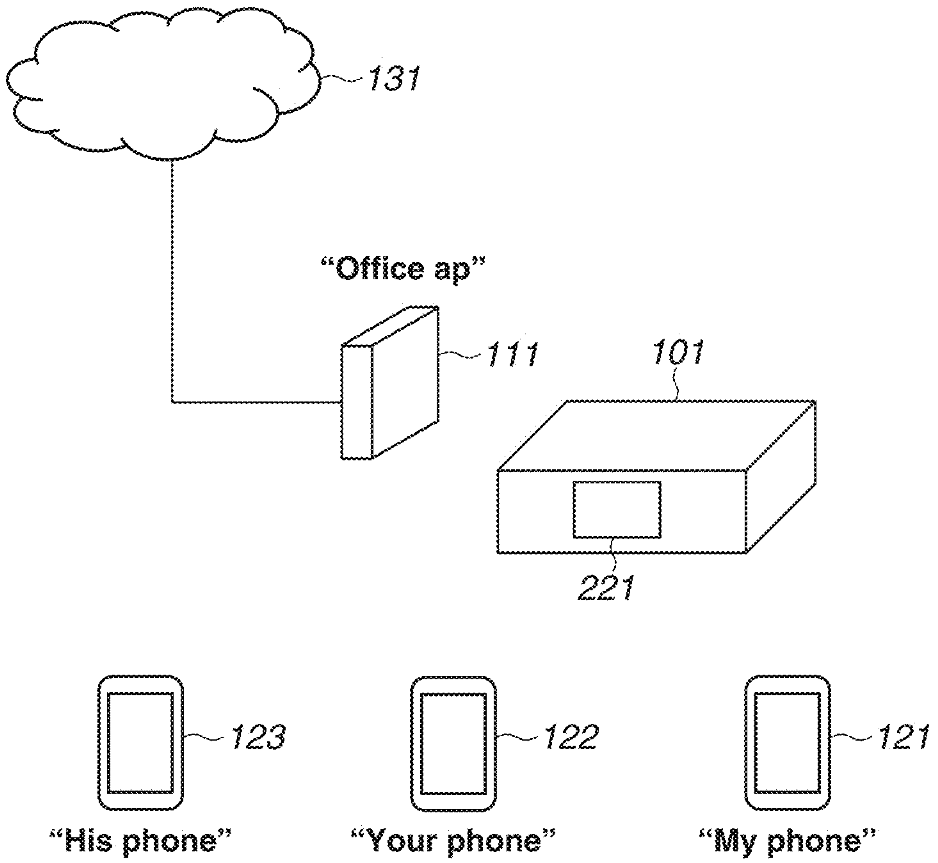
FIG. 1 illustrates a network configuration to which exemplary embodiments are applicable.

Exemplary embodiments are described in detail below with reference to the accompanying drawings. A configuration described below is merely illustrative, and the exemplary embodiments are not limited to the illustrated configuration.

In the following, an example of a wireless local area network (LAN) system supporting an Institute of Electrical and Electronics Engineers (IEEE) 802.11 standard will be described. The wireless LAN system may support other communication standards, such as Bluetooth®, near field communication (NFC), ultrawide band (UWB), Zigbee, and multiband orthogonal frequency division multiplexing (OFDM) alliance (MBOA), in addition to the IEEE802.11 standard series. The UWB includes wireless universal serial bus (USB) and wireless1394. The following exemplary embodiments do not limit the invention according to the claims. Although a plurality of features is described in the exemplary embodiments, all of the plurality of features are not necessarily essential for the invention, and the plurality of features may be optionally combined. Further, in the accompanying drawings, the same or similar components are denoted by the same reference numerals, and repetitive description is omitted.

FIG. 1 illustrates a network configuration to which the exemplary embodiments are applicable; however, the network configuration is not limited thereto as long as a wireless communication apparatus including a plurality of stations (STAs) and a plurality of other wireless communication apparatuses each including an access point (AP) that is connectable to the wireless communication apparatus including the STAs are provided. A term "connection" indicates a state where a signal and data are transmittable and receivable, and indicates that a line or a transmission path (link) in a communicable state is established between paired apparatuses. Further, a term "connected state" in the exemplary embodiments indicates a state where the link is established and data is transmittable and receivable.

In FIG. 1, a printer 101 is a wireless communication apparatus including a plurality of STAs. The printer 101 may be, for example, a camera, a personal computer (PC), a television (TV), a projector, an Internet of things (IoT) apparatus, such as a smart appliance, and a smart device, such as a smartphone and a tablet, as long as the printer 101 is the wireless communication apparatus including the plurality of STAs.

A wireless router 111 includes an AP. Smart devices 121, 122, and 123 each include an AP. Each of the wireless router 111 and the smart devices 121, 122, and 123 includes the AP, and is connectable as the AP to the STA. Further, service set identifiers (SSIDs) of networks formed by the wireless router 111 and the smart devices 121, 122, and 123 are respectively "Office ap", "My phone", "Your phone", and "His phone". The wireless router 111 and the smart devices 121, 122, and 123 may be a wireless router, a modem, a smart device, such as a smart phone, a tablet, and a smart watch, and a PC, as long as each of the wireless router 111 and the smart devices 121, 122, and 123 is the wireless communication apparatus including the AP. The printer 101 is selectively connectable to the wireless router 111 and the smart devices 121, 122, and 123.

Figure 2:
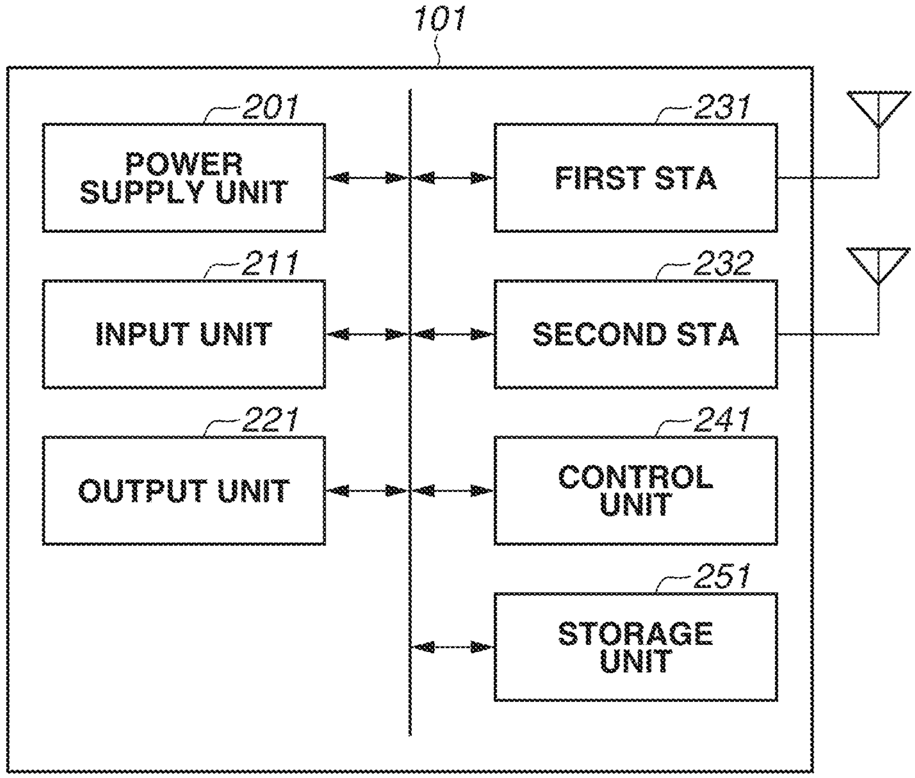
FIG. 2 illustrates a configuration of a printer.

FIG. 2 illustrates a configuration of the printer 101.

A power supply unit 201 supplies power to every hardware device. The power supply unit 201 obtains the power from, for example, an alternating-current power supply or a battery.

An input unit 211 receives various types of operation from a user. The input unit 211 includes an operation button.

An output unit 221 performs various types of output to the user. Examples of the output by the output unit 221 include display by a light-emitting diode (LED), display of a screen, sound output by a speaker, and vibration output. Both of the input unit 211 and the output unit 221 may be realized by one module, like a touch panel. The input unit 211 and the output unit 221 are not necessarily incorporated in the printer 101, and input and output may be performed through a terminal or the like different from the printer 101. In the following, a description is provided based on the premise that input and output are performed using a touch panel.

A first STA 231 and a second STA 232 each perform wireless LAN control complying with the IEEE802.11 standard and transmission and reception of radio waves, and are connected to APs. The printer 101 is configured to operate the two STAs in parallel, and is connectable to two APs at the same time. The number of STAs of the printer 101 is not limited to two, and the printer 101 may include three or more STAs. The printer 101 is able to operate the optional number of STAs in parallel.

A control unit 241 includes a processor, such as a central processing unit (CPU) and a micro processing unit (MPU), and controls the entire printer 101 by executing programs stored in a storage unit 251. In place of the control unit 241, a plurality of hardware devices may share processing to control the entire printer 101.

The storage unit 251 includes a memory, such as a random access memory (RAM) and a read only memory (ROM), and stores programs for various types of processing described below and information about the APs connected to the STAs. The storage unit 251 may previously obtain and store various types of information, such as information to be used by the printer 101 to connect to other communication apparatuses by using the STAs.

Figure 3:
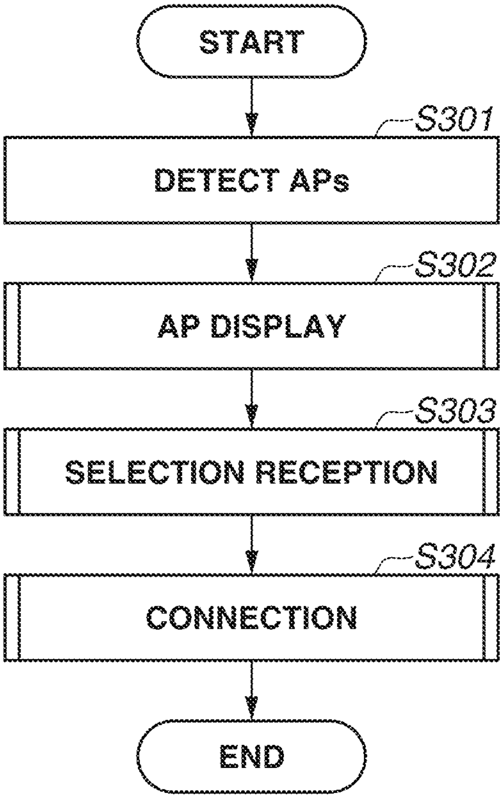
FIG. 3 is a flowchart illustrating setting processing for the printer.

A first exemplary embodiment of the present invention will be described below. In a first exemplary embodiment, processing of settings for connection to external APs will be described with reference to a flowchart illustrating setting processing for the printer 101 in FIG. 3.

The setting processing starts to set a connection destination of the printer 101. For example, the setting processing starts in a case where the user operates the touch panel to select a setting menu for setting the connection destination of the printer 101.

When the setting processing starts, the printer 101 detects information about neighboring APs in step S301. In AP detection processing in step S301, the printer 101 is able to detect the information about the neighboring APs by using the plurality of STAs. In the AP detection processing in step S301, for example, the printer 101 detects the information about the neighboring APs by receiving a beacon and a probe response that are signals sent from the neighboring APs. Examples of the information about the APs include an SSID, a basic service set identifier (BSSID), a media access control (MAC) address, and a unique device identifier.

Next, in step S302, the information about the APs detected in the AP detection processing in step S301 are displayed. In AP display processing in step S302, the information about the APs is displayed on the touch panel in the present exemplary embodiment; however, this is not restrictive. For example, the information about the APs may be displayed on an external terminal to which the printer 101 has been connected, such as a television and a smartphone. In the present exemplary embodiment, the SSIDs are displayed as the information about the APs on the touch panel; however, the information about the APs is not limited thereto.

Next, in step S303, selection of the APs to which the printer 101 is to be connected is received from the user. In selection reception processing in step S303, the APs to which the printer 101 is to be connected is selectable by the user selecting the information about the APs displayed on the touch panel. In the selection reception processing in step S303, selection of the APs to which the printer 101 is to be connected is receivable by the number of STAs provided in the printer 101.

Next, in step S304, connection processing is performed based on the user having performed a predetermined operation to end the input in a state where the plurality of APs is selected in the selection reception processing in step S303. The predetermined operation is, for example, pressing of an end button, an OK button, a connection button, or a determination button. For example, assume that that, when the user performs the predetermined operation to end the input in the selection reception processing in step S303, the smart devices 121 and 121 are in a selected state. In this case, in the connection processing in step S304, first connection processing for establishing a first link with the smart device 121 by using the first STA 231 is performed. Further, subsequent to or in parallel with the first connection processing, second connection processing for establishing a second link with the smart device 122 by using the second STA 232 is performed.

In an existing technique, the above-described predetermined operation (i.e., pressing of end button, OK button, connection button, determination button, etc.) is to be performed every time one AP is selected, which is troublesome to establish links with the plurality of APs. In contrast to this, in the present exemplary embodiment, the links with the plurality of APs are established based on the user having performed the above-described predetermined operation in the state where the plurality of APs is selected. This simplifies the user operation.

Figure 4:
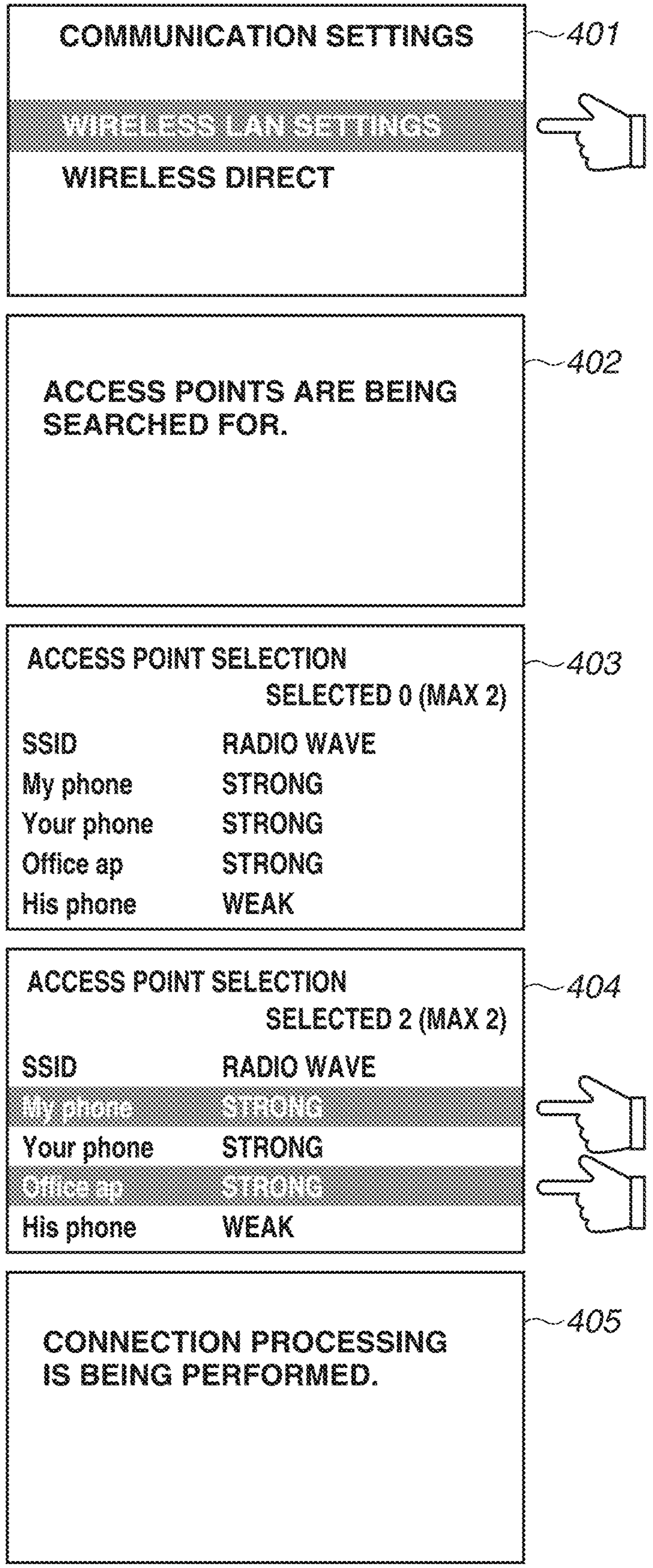
FIG. 4 illustrates a first display transition example.

Next, the first exemplary embodiment will be described with reference to a display transition example in FIG. 4. FIG. 4 illustrates a first display transition example. In the present exemplary embodiment, neither the first STA 231 nor the second STA 232 of the printer 101 has established a link with an external AP.

A screen 401 is displayed when the user operates the input unit 211 and selects a menu for communication settings, such as a setting menu. For example, the setting processing starts based on reception of selection relating to connection settings of the printer 101.

A screen 402 is displayed when neighboring APs are being searched for. The printer 101 detects the neighboring APs, and acquires information about the neighboring APs.

A screen 403 is an "access point selection" screen displayed after the screen 402, and displays an AP list through the AP display processing in step S302. In the AP list, the SSIDs or the BSSIDs of networks formed by the detected APs are often used. The information about the APs detected in the AP detection processing in step S301 may be optionally used. In the present exemplary embodiment the SSIDs and radio wave intensities of wireless networks constructed by the APs of the wireless router 111 and the smart devices 121, 122, and 123 are displayed as the AP list. A display format of the AP list is not limited thereto. For example, the APs may be displayed in order of strong radio wave intensity or in order close to the printer 101.

A screen 404 is displayed when selection of the APs as the connection destinations is received from the user via the input unit 211. In the present exemplary embodiment, the user first selects "My phone" (smart device 121), and then selects "Office ap" (wireless router 111). Therefore, "My phone" and "Office ap" are in the selected state and are highlighted. A method of displaying the selected state is not limited to the highlight, and it is sufficient to recognizably display the selected state by using, for example, a color, a character, and a symbol.

A screen 405 is displayed after the screen 404. The screen 405 is displayed after the user performs the predetermined operation to end the input in the screen 404, and processing for connection to the APs in the selected state at the time when the user performs the predetermined operation is performed. The predetermined operation here is pressing of an OK button, a determination button, an end button, a connection button, or the like (all not illustrated) by the user. To establish the links with the APs, a passwords to be used for encryption is to be input depending on encryption methods of the wireless LANs set to the APs. In the present exemplary embodiment, input of the passwords is omitted. As for input of the passwords, input screens for the passwords of the respective APs may be displayed after the user selects the APs as the connection destinations in the screen 404, to prompt the user to input the passwords.

As described above, enabling the plurality of APs as the connection destinations to be collectively selected and enabling the processing for connection to the APs to be performed successively or in parallel improve operability when the user designates the plurality of APs to be connected.

In the present exemplary embodiment, the printer 101 establishes the links with the two APs through the first STA 231 and the second STA 232. In the screen for selecting the APs to be connected, the user performs the predetermined operation to end the input in the state where the wireless router 111 and the smart device 121 are selected. Therefore, the printer 101 performs the connection processing for establishing the link between the first STA 231 and the wireless router 111 and the link between the second STA 232 and the smart device 121, based on the predetermined operation to end the input by the user.

In the present exemplary embodiment, the links with the plurality of APs are established based on the user having performed the above-described predetermined operation (i.e., pressing of end button, OK button, connection button, determination button, etc.) in the state where the plurality of APs is selected. This improves the operability for the user when the wireless communication apparatus forms the links with the plurality of external APs.

Figure 5:
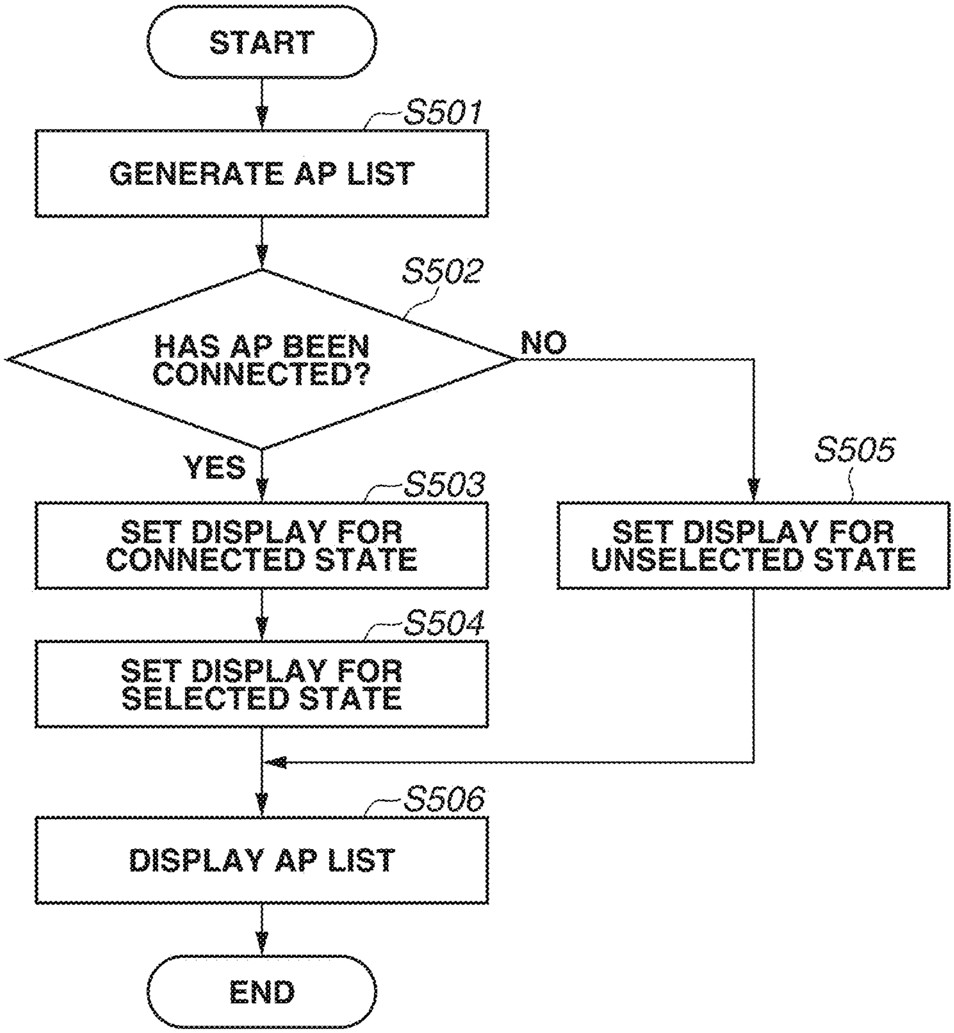
FIG. 5 is a flowchart illustrating access point (AP) display processing.
Figure 6:
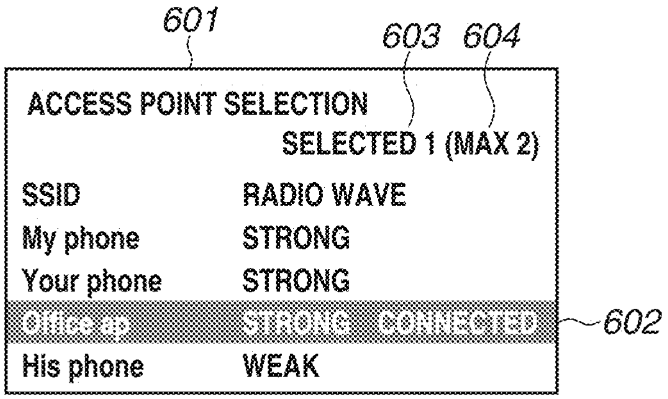
FIG. 6 illustrates a display example of an AP list.

A second exemplary embodiment of the present invention will be described below. In the second exemplary embodiment, an example of the AP display processing in step S302 according to the first exemplary embodiment will be described with reference to a flowchart of the AP display processing in FIG. 5 and a display example of the AP list in FIG. 6. In the second exemplary embodiment, when the information about the APs is displayed in the AP display processing in step S302, the information about the AP that has been connected to the printer 101 is recognizably displayed, which makes it possible to improve convenience for the user in the connection settings.

Initially in step S501, the AP list is generated based on the information about the APs detected in the AP detection processing in step S301. In the AP list, the SSIDs or the BSSIDs of the networks formed by the APs detected in the AP detection processing in step S301 are often used. Alternatively, the acquired information about the APs may be optionally used.

Next, different display methods of the information about the APs are set based on whether each of the APs in the AP list has been connected to the printer 101. In a case where the information about the AP connected to the printer 101 is displayed, the display method is set such that the user can recognize that the AP is currently connected to the printer 101. In step S502, processing is branched based on a connection status to the printer 101, of each of the APs included in the AP list generated in step S501. For example, assume that that the AP list generated in the AP list generation processing in step S501 includes the information about the wireless router 111 and the smart devices 121, 122, and 123 and that the wireless router 111 has been connected to the printer 101, and each of the smart devices 121, 122, and 123 has not been connected to the printer 101. In this case, since the wireless router 111 has been connected to the printer 101 in step S502 (YES in step S502), display setting of the information about the wireless router 111 is performed in steps S503 and S504. The setting in step S503 is performed such that the information about the wireless router 111 is displayed in the connected state, and the setting in step S504 is performed such that the information about the wireless router 111 is displayed in the selected state.

Since each of the smart devices 121, 122, and 123 has not been connected to the printer 101 in step S502 (NO in step S502), display setting for the information about the smart devices 121, 122, and 123 is performed in step S505. The setting is performed in step S505 such that the information about the smart devices 121, 122, and 123 is displayed in an unselected state.

In step S506, the AP list is displayed based on the display settings in steps S502 to S505. A screen 601 is a display example in step S506, and the SSIDs of the wireless router

111 and the smart devices 121, 122, and 123 are displayed in the AP list. In the screen 601, "Office ap" (wireless router 111) is displayed in the connected state and the selected state (602). The display in the connected state indicates that the connected state is recognizably displayed. In the screen 601, a character string "connected" is displayed together so that the user can recognize that "Office ap" has been connected to the printer 101. Further, in the screen 601, "Office ap" is highlighted such that the selected state is recognizable. For example, the number of currently selected APs (603) and the maximum number of APs to which the printer 101 is connectable (604) may be displayed together.

As described above, various types of information are presented together when the AP list is displayed, which enables the user to recognize the selection status and the connection status in the selection reception processing in step S303. This enables the user to change and/or correct the selected state in a state where the selection status and/or the connection status are/is recognizable, and convenience for the user is improved.

Figure 7:
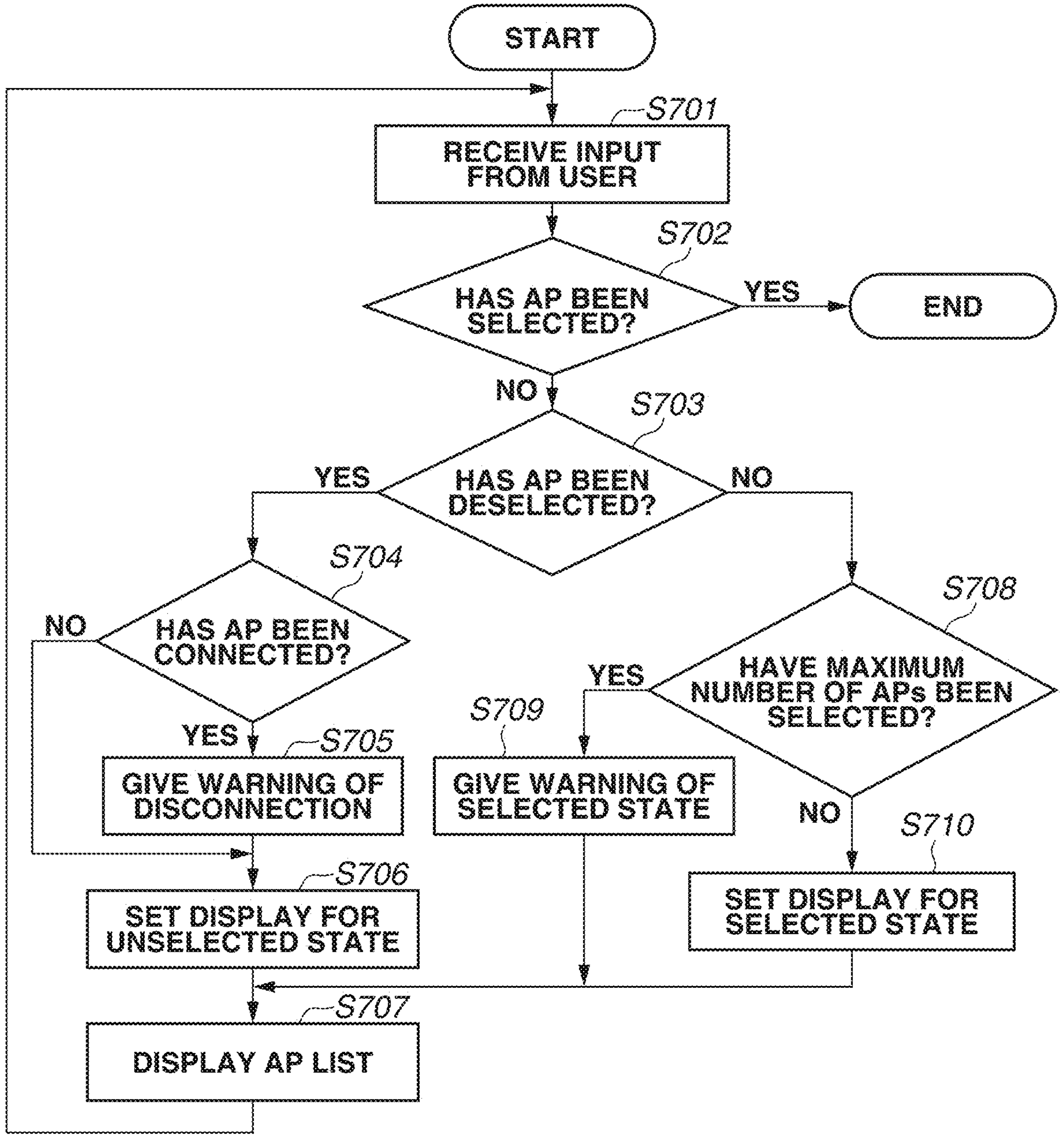
FIG. 7 is a flowchart illustrating selection reception processing.

A third exemplary embodiment of the present invention will be described below. In the third exemplary embodiment, an example of the selection reception processing in step S303 according to the first exemplary embodiment will be described with reference to a flowchart of the selection reception processing in FIG. 7. In the third exemplary embodiment, for example, it is possible to receive a plurality of selections made by the user in the selection reception processing in step S303, which facilitates the selection work by the user and improve convenience.

When the selection reception processing starts, an input from the user is received in step S701.

Here, if the case where the user performs the predetermined operation to end the input, as in the case where the user presses the end button, the OK button, the connection button, or the determination button (YES in step S702), the selection reception processing ends. The connection processing for establishing the links with the APs in the selected state at the time when the predetermined operation to end the input is received is performed.

In a case where the user selects the AP in the selected state in input reception processing in step S701 (YES, in step S703), the processing proceeds to step S704. In step S704, it is determined whether the AP that the user has selected has been connected to the printer 101. If the AP in the selected state selected has been connected to the printer 101 (YES in step S704), the processing proceeds to step S705. In step S705, a warning of disconnection of the link with the AP may be provided. After the warning is provided or if the selected AP has not been connected to the printer 101 (NO in step S704), the processing proceeds to step S706. In step S706, setting is performed such that the AP is displayed in the unselected state. Together with setting of the display in the unselected state, setting may be performed so as to change display of the number of currently selected APs. Thereafter, the processing proceeds to step S707 and in step S707, the AP list is displayed based on the setting in step S706.

Next, a case where the user selects the AP in the unselected state in the input reception processing in step S701 will be described (NO, in step S703). If the number of APs currently selected is equal to a maximum selectable number of APs (YES in step S708), the processing proceeds to step S709. In step S709, a warning thereabout is provided. If the number of selected APs is less than the maximum number of APs to which the printer 101 is connectable (NO in step S708), the processing proceeds to step S710. In step S710, the setting is changed so as to display the selected APs in the selected state. Together with the setting to display the selected APs in the selected state, the setting may be performed so as to change the display of the number of currently selected APs in the AP list.

Thereafter, the processing proceeds to step S707. In step S707, the AP list is displayed based on the setting made in step S710. Together with display of the AP list, the number of selected APs may be displayed in the displayed AP list based on the setting made in step S710. As described above, the plurality of selections by the user is receivable in the selection reception processing in step S303, which enables the user to easily perform reselection. The selection status and the connection status are made recognizable in the display of the output unit of the touch panel in accordance with the selection by the user, which improves convenience for the user. In a case where the AP that has been connected is selected, providing a warning of disconnection makes it possible to prevent selection unintended by the user.

Figure 8:
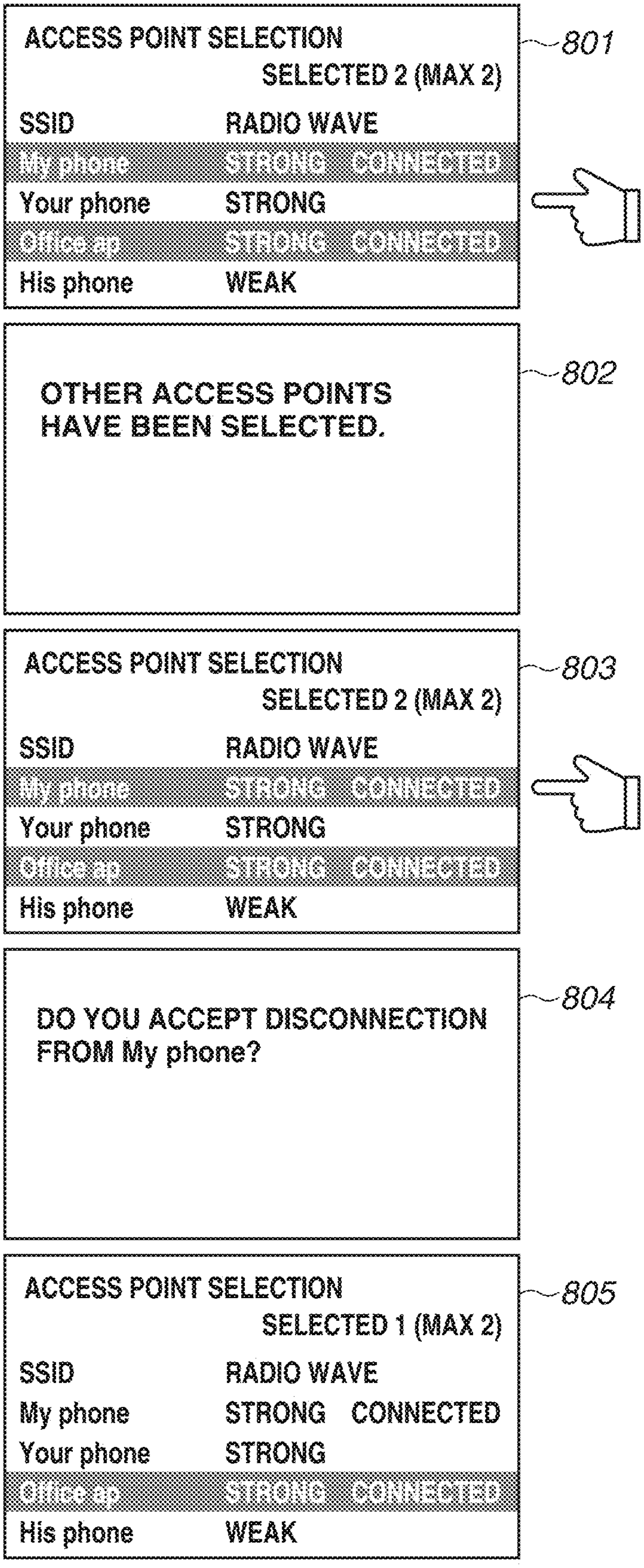
FIG. 8 illustrates a second display transition example.
Figure 9:
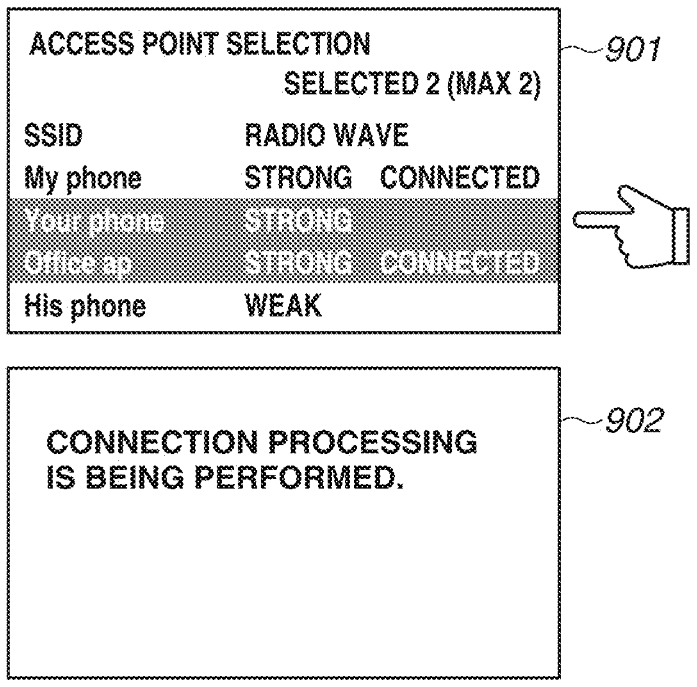
FIG. 9 illustrates a third display transition example.

Next, the third exemplary embodiment is described with reference to display transition examples in FIG. 8 and FIG. 9. FIG. 8 illustrates a second display transition example, and FIG. 9 illustrates a third display transition example. In the present exemplary embodiment, the printer 101 has been connected to the wireless router 111 and the smart device 121.

A screen 801 is an "access point selection" screen, and displays the AP list based on the AP display processing in step S302. The AP list is displayed such that the connected state and the selected state of "My phone" and "Office ap" are recognizable. In this example, the user selects "Your phone".

A screen 802 is displayed after the screen 801, and is a warning screen displayed when the user selects the AP in the unselected state, in a state where the maximum number of APs to which the printer 101 is connectable are currently selected.

A screen 803 is displayed after the screen 802. The APs in the selected state are not changed based on the user input because the maximum number of APs to which the printer 101 is connectable are currently selected. Next, a description will be provided assuming a case where the user selects "My phone" in the screen 803.

A screen 804 is displayed after the user selects "My phone", and is a screen providing the user a warning of disconnection of the link with the AP having the SSID "My phone".

A screen 805 is displayed after the screen 804, and "My phone" is displayed in the unselected state based on the user input in step S703. In the screen, "My phone" is in the unselected state, so that is displayed without being highlighted.

A screen 901 is displayed when the user selects "Your phone". In the screen 901, "Your phone" is highlighted such that the selected state of "Your phone" is recognizable based on the selection of "Your phone" by the user.

A screen 902 is displayed after the screen 901. The screen 902 is displayed after the user performs the predetermined operation to end the input in the screen 901. The screen 902 indicates that the connection processing for the APs in the selected state at the time when the user performs the predetermined operation, such as pressing of the OK button, the determination button, or the like (all not illustrated) in the screen 901, is performed. In the present exemplary embodiment, since the AP having the SSID "Office ap" has been connected, the connection processing only for the AP having SSID "Your phone" is newly performed.

In the present exemplary embodiment, based on the user having performed the predetermined operation to end the input (i.e., pressing of end button, OK button, connection button, etc.) in the state where the plurality of APs is selected, the links with the plurality of APs are established. This improves operability for the user when the wireless connection apparatus forms the links with the plurality of external APs. The warning is displayed based on the user input to disconnect the AP that has been connected, which makes it possible to prevent selection of a connection destination unintended by the user.

A fourth exemplary embodiment of the present invention will be described. In the third exemplary embodiment, the case where an AP in the unselected state is selected in the selection reception processing in step S303 with the maximum number of APs to which the printer 101 is connectable being in the selected state has been described. At that time, the warning is displayed in the third exemplary embodiment, and the APs in the selected state are not changed. The fourth exemplary embodiment is different from the third exemplary embodiment in that, in the foregoing case, one of the selected APs is deselected, and the newly selected AP is set to the selected state.

Figure 10:
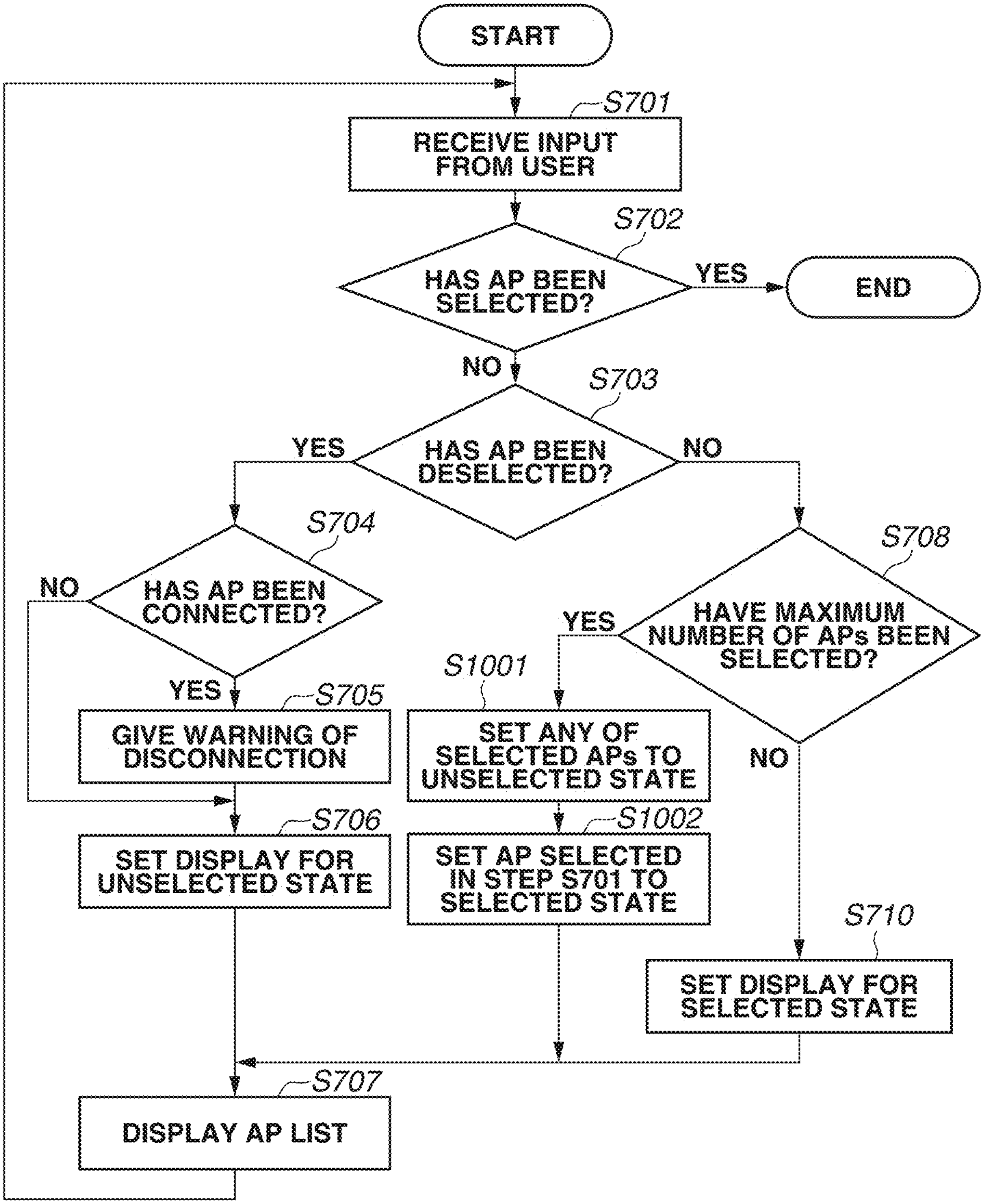
FIG. 10 is a second flowchart illustrating the selection reception processing.

Initially, differences between the present exemplary embodiment and the third exemplary embodiment will be described with reference to a second flowchart of the selection reception processing in FIG. 10. The present exemplary embodiment is different from the third exemplary embodiment in the processing in the case where the user selects the AP in the unselected state with the number of APs selected being equal to the maximum connectable number of APs. In FIG. 10, operations in steps S1001 and S1002 are different from the processing according to the third exemplary embodiment.

In the present exemplary embodiment, in the case where the user selects the AP in the unselected state with the number of APs selected being equal to the maximum connectable number of APs, setting is performed such that the selected APs are set to the unselected state in step S1001. At this time, for example, the user may select an AP to be put into the unselected state among the selected APs, or the AP having weak radio wave intensity or the AP previously put into the selected state may be automatically selected.

Next, in step S1002, setting is performed such that the AP selected by the user in step S701 is displayed in the selected state.

Figure 11:
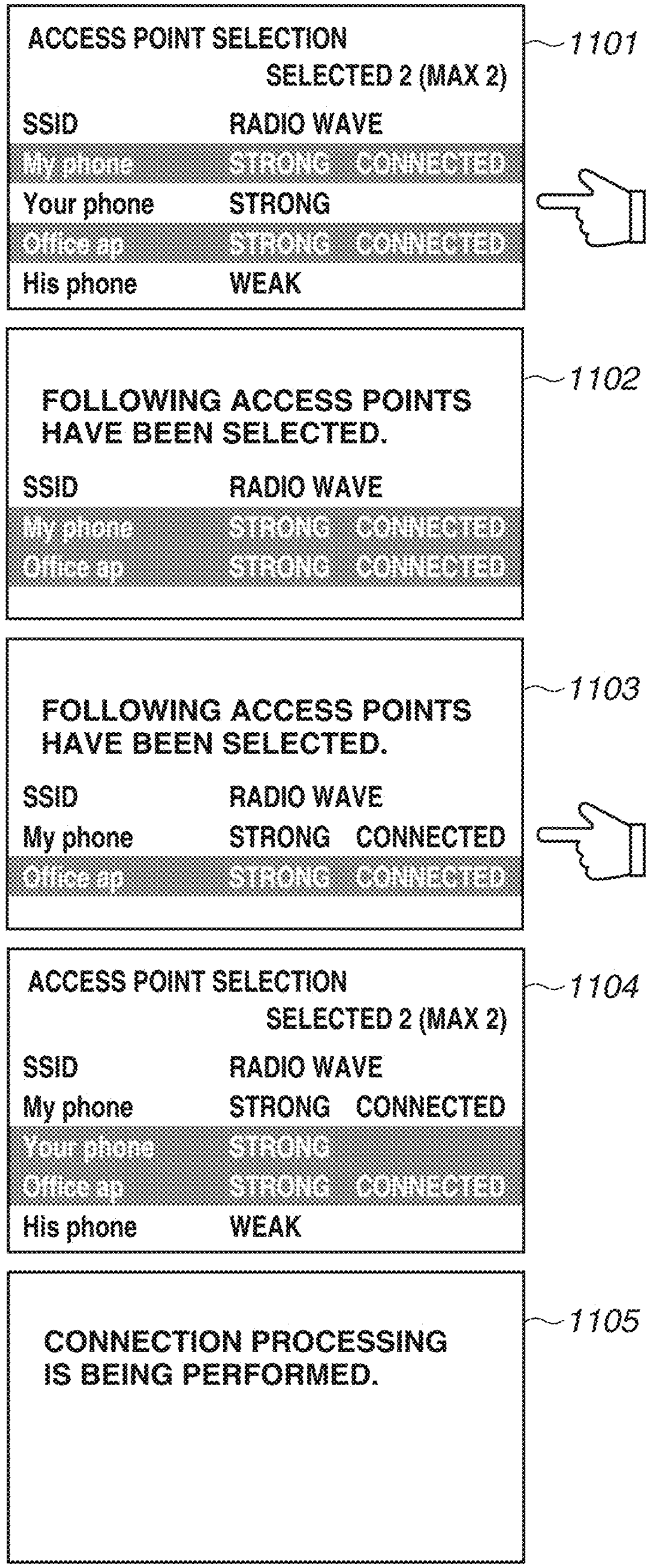
FIG. 11 illustrates a fourth display transition example.

Next, the present exemplary embodiment is described with reference to a fourth display transition example in FIG. 11. In the present exemplary embodiment, the printer 101 has been connected to the wireless router 111 and the smart device 121.

A screen 1101 is an "access point selection" screen, and displays the AP list based on the AP display processing in step S302. The AP list is displayed such that the connected state and the selected state of "My phone" and "Office ap" can be distinguished. It is assumed that the user selects "Your phone".

A screen 1102 is displayed after the screen 1101, and is displayed in the case where the user selects the AP in the unselected state with the maximum number of APs to which the printer 101 is connectable being selected. In the screen 1102, only the currently selected APs are displayed. In a screen 1103, the AP to be put into the unselected state is selected based on the user input. In the present exemplary embodiment, "My phone" is put into the unselected state based on selection of "My phone" by the user. At this time, a plurality of selections may be received, and a plurality of APs may be put into the unselected state.

A screen 1104 is displayed after the screen 1103, and is displayed such that the selected state of "Your phone" and "Office ap" and the unselected state of "My phone" are recognizable.

A screen 1105 is displayed after the screen 1104. The screen 1105 is displayed after the user performs the predetermined operation to end the input in the screen 1104, and the processing for connecting to the APs in the selected state at the time when the user performs the predetermined operation is performed. In the present exemplary embodiment, since the AP having the SSID "Office ap" has been connected, the connection processing only for the AP having SSID "Your phone" is newly performed.

As described above, in the case where the user selects the AP in the unselected state while the maximum number of APs to which the wireless communication apparatus is connectable are currently selected, it is possible to present a candidate for the AP to be put into the unselected state and receive the user selection. The APs in the connected state are displayed so as to be easily recognizable, thus facilitating the user selection operation and improving convenience for the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151519, filed Sep. 22, 2022, which is hereby incorporated by reference herein in its entirety.

What is claimed is:

1. A wireless communication apparatus including a plurality of stations (STAs) including at least a first STA and a second STA, and connectable to a plurality of access points (APs) in parallel, the wireless communication apparatus comprising:

at least one memory that stores a set of instructions; and at least one processor that executes the instructions, the instructions, when executed, causing the communication apparatus to perform operations comprising:

detecting an AP and detecting information associated with the detected AP;

causing a display unit to display a plurality of APs displaying at least some of the detected information associated with each detected AP of the plurality of detected APs;

selecting at least one AP among the plurality of APs displayed on the display unit; and establishing a link with the selected AP-selected by the selection unit, wherein, at least some of the detected information displayed for each detected AP of the plurality of detected APs is different from at least some of the detected information displayed for each of the other detected APs of the plurality of detected APs, wherein the establishing comprises, based on a user having performed a predetermined operation in a state where a first AP and a second AP are selected, establishing automatically a link with the first AP by using the first STA and establishing a link with the second AP by using the second STA.

2. The wireless communication apparatus according to claim 1, wherein the operations further comprise causing the display unit to recognizably display an AP in a selected state and an AP in an unselected state among the plurality of APs detected by the detection unit.

3. The wireless communication apparatus according to claim 2, wherein the operations further comprise causing the display unit to display an AP for which a link has been established with the wireless communication apparatus, among the plurality of APs, in such a manner that it is recognized that the link has been established.

4. The wireless communication apparatus according to claim 3, wherein the operations further comprise causing the display unit to display information indicating that a connection to the first AP is to be disconnected based on the selection unit having selected the first AP that is in the selected state and for which the link has been established.

5. The wireless communication apparatus according to claim 4, wherein the operations further comprise causing the display unit to display the number of APs in the selected state among the plurality of displayed APs.

6. The wireless communication apparatus according to claim 5, wherein the operations further comprise causing the display unit to display a maximum number of APs to which the wireless communication apparatus is connectable in parallel.

7. The wireless communication apparatus according to claim 6, wherein each of the first STA and the second STA is connected to a corresponding AP by using a protocol complying with an Institute of Electrical and Electronics Engineers (IEEE) 802.11 standard.

8. A method for controlling a wireless communication apparatus, the wireless communication apparatus including a plurality of stations (STAs) including at least a first STA and a second STA, and connectable to a plurality of access points (APs) in parallel, the method comprising:

detecting an AP and detecting information associated with the detected AP;

causing a display unit to display a plurality of APs displaying at least some of the detected information associated with each detected AP of the plurality of detected APs;

selecting at least one AP among the plurality of APs displayed on the display unit; and establishing a link with the selected AP, wherein, at least some of the detected information displayed for each detected AP of the plurality of detected APs is different from at least some of the detected information displayed for each of the other detected APs of the plurality of detected APs, wherein, the establishing comprises, based on a user having performed a predetermined operation in a state where a first AP and a second AP are selected, establishing automatically a link with the first AP by using the first STA, and a link with the second AP by using the second STA.

9. A non-transitory computer-readable storage medium storing a program for causing a computer to to perform a process of a wireless communication apparatus, the wireless communication apparatus including a plurality of stations (STAs) including at least a first STA and a second STA, and connectable to a plurality of access points (APs) in parallel, and the process comprising:

detecting an AP and detecting information associated with the detected AP;

causing a display unit to display a plurality of APs displaying at least some of the detected information associated with each detected AP of the plurality of detected APs;

selecting at least one AP among the plurality of APs displayed on the display unit; and establishing a link with the selected AP, wherein, at least some of the detected information displayed for each detected AP of the plurality of detected APs is different from at least some of the detected information displayed for each of the other detected APs of the plurality of detected APs, wherein, the establishing comprises, based on a user having performed a predetermined operation in a state where a first AP and a second AP are selected, establishing automatically a link with the first AP by using the first STA;

and a link with the second AP by using the second STA.

10. The wireless communication apparatus according to claim 1, wherein the at least some of the detected information displayed for each detected AP includes a SSID or a BSSID, the SSID or BSSID for each AP being different to the SSID or BSSID of the other APs.

* * * * *